(12) United States Patent
Kallio

(10) Patent No.: US 7,400,881 B2
(45) Date of Patent: Jul. 15, 2008

(54) METHOD FOR THE ROUTING OF COMMUNICATIONS TO A VOICE OVER INTERNET PROTOCOL TERMINAL IN A MOBILE COMMUNICATION SYSTEM

(75) Inventor: Juha Kallio, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/105,390

(22) Filed: Apr. 14, 2005

(65) Prior Publication Data

US 2006/0142011 A1 Jun. 29, 2006

(30) Foreign Application Priority Data

Dec. 23, 2004 (FI) ................... 20041659

(51) Int. Cl.
*H04Q 7/20* (2006.01)
(52) U.S. Cl. .................. 455/412.2; 455/414.1
(58) Field of Classification Search .......... 455/445, 455/435.1, 338, 403, 434, 416, 432.1, 406, 455/422, 453
See application file for complete search history.

(56) References Cited

U.S. PATENT DOCUMENTS

| | | | |
|---|---|---|---|
| 7,020,120 B2 * | 3/2006 | Inoue et al. .......... 370/338 |
| 7,072,961 B1 * | 7/2006 | Maclean et al. .......... 709/224 |
| 7,075,908 B2 * | 7/2006 | Noguchi et al. .......... 370/329 |
| 2002/0119775 A1 | 8/2002 | Mukherjee et al. | |
| 2006/0121904 A1 * | 6/2006 | Reuhkala et al. .......... 455/445 |

FOREIGN PATENT DOCUMENTS

| WO | WO 00/79814 A1 | 12/2000 |
|---|---|---|
| WO | WO 01/22766 A1 | 3/2001 |
| WO | WO 2004/017564 A1 | 2/2004 |

* cited by examiner

*Primary Examiner*—Naghmeh Mehrpour
(74) *Attorney, Agent, or Firm*—Squire, Sanders & Dempsey L.L.P.

(57) ABSTRACT

The invention relates to a method a method for routing calls and messages in a communication system. In the method a mobile station registers to a call control node using a logical name. The logical name is mapped in a directory to an international mobile subscriber identity. The call control node performs a location update to a home location register using the international mobile subscriber identity. The mobile station is reached using a called party number. As a terminating call or message is received to a core network, a roaming number is allocated for the mobile station, and the call or message is routed to the call control entity currently serving the mobile station. The call control node translates the called party number to the logical name using the directory.

26 Claims, 6 Drawing Sheets

METHOD FOR THE ROUTING OF COMMUNICATIONS TO A VOICE OVER INTERNET PROTOCOL TERMINAL IN A MOBILE COMMUNICATION SYSTEM

BACKGROUND OF THE INVENTION

1. Field of the Invention

The invention relates to routing in mobile communication systems. Particularly, the invention relates to the routing of communications to a Voice over IP (VoIP) terminal in a mobile communication system.

2. Description of the Related Art

Recently Wireless Local Area Networks (WLAN) have become important in mobile communications. The advantage of WLANs over licensed band cellular communication systems such as the Universal Mobile Telecommunication system (UMTS) and Global System of Mobile communications (GSM) lies in the facts that they use an unlicensed band and the cell sizes are much smaller. These facts make possible to build private WLANs operated by small corporate entities and individual users. The cost of wireless communication in these WLANs is significantly cheaper than in licensed band cellular systems. WLANs have mostly been used for Internet access, but the idea of providing voice communications over WLANs has recently gained momentum. In order to obtain a wide market share for voice over WLAN technologies and to provide a reliable service experience for end-users, it is necessary to be able to provide dual system terminals, which support both WLAN and licensed band based radio access. In other words, it must be possible for users to roam in both WLANs and licensed band cellular systems. Usually WLAN radio access is used in urban areas where there exists a WLAN infrastructure, whereas licensed band cellular systems are used in areas outside the WLAN coverage.

3G Partnership Project has standardized the IP Multimedia Subsystem (IMS) in order to cater for VoIP and other IP based multimedia services. Typically, a UMTS Radio Access Network is used to access a core network, which supports the IMS. However, existing circuit switched core network infrastructures, which comprise Mobile Switching Centers (MSC), Home Location Registers (HLR), Visitor Location Centers (VLR), Camel Service Entities (CSE) and Service Control Points (SCP), provide a wide range of services. When operators wish to accommodate dual system terminals with both WLAN and licensed band radio access capabilities, it would be beneficial, if the operators had some mechanism of offering same services over both radio access technologies. Especially, the providing of backward compatible service is important. In other words, it is necessary to be able to provide familiar look-and-feel services from the licensed band cellular system also in the WLAN side. These services are referred to as the legacy services. Examples of such services include call forwarding, prepaid, premium rate and free service numbers, call waiting and call transfer. Usually, prepaid service and service numbers are provided using Intelligent Network infrastructure comprising MSCs and SCPs. In the 3GPP standardized version of Intelligent Networks the SCPs are referred to as the CSEs.

Reference is now made to FIG. 1, which illustrates the problems associated with the providing of legacy services for dual system terminals in prior art. FIG. 1 illustrates the fact that in practice the legacy services must be rebuilt in the IMS. In IMS the network elements and the protocols are largely different so this represents a significant effort. In Figure there is a Mobile Station (MS) 100, which is a dual system mobile station capable of communicating both over a WLAN radio access and a licensed band radio access. The licensed band radio access may be, for example, a Time Division Multiple Access (TDMA) based GSM radio access or a Wideband Code Division Multiple Access (WCDMA) based UMTS radio access. In FIG. 1 there is also a WLAN 124, which communicates with an IP Multimedia Subsystem (IMS) comprising at least a P-CSCF 102, an I-CSCF 104, an S-CSCF 106, a MGCF 120 and a MGW 122. Multimedia communications to and from MS 100 when in the area of WLAN 124 are provided via IMS. WLAN 124 is connected to Media Gateway (MGW) 122, which converts IP-based user plane traffic to circuit switched PSTN 126. WLAN 124 communicates also with Proxy Call State Control Function (P-CSCF) 102. Signaling plane traffic is routed to a P-CSCF such as P-CSCF 102. The signaling plane traffic is, for example, Session Initiation Protocol (SIP) based. SIP is defined in Internet Engineering Task Force (IETF) document RFC 3261. P-CSCF 102 is used to access Inquiring Call State Control Function (I-CSCF) 104, which determines using a Home Subscriber Server (HSS) 108 Serving Call State Control Function (S-CSCF) 106 in which a given subscriber is currently registered. The S-CSCF controls the multimedia communications originating from and terminating to MS 100. The S-CSCF communicates with Media Gateway Control Function (MGCF) 120, which converts signaling plane traffic into circuit switched signaling. For example, MGCF 120 converts the SIP signaling used between MS 100, P-CSCF 102, I-CSCF 104, S-CSCF 106 and MGCF 120 into the ISDN User Part (ISUP) signaling used in PSTN 126. MGCF 120 also controls MGW 122 using, for example, International Telecommunications Union (ITU-T) H.248 protocol. S-CSCF 106 is connected to three service platforms, namely Application Server (AS) 110, CSE 116 and Open Service Architecture (OSA) server 118. S-CSCF 106 is connected to CSE 116 via IP Mobility (IM) Service Switching Function (SSF) 112. S-CSCF 106 is connected to OSA server 118 via Service Capability Server (SCS) 114.

In FIG. 1 there is also a GSM/UMTS BSS 160, which is connected to a GSM/UMTS circuit switched core network comprising at least an MSC 150, a VLR 152, a GMSC 156, an HLR 154 and a CSE 158. GSM/UMTS BSS 160 is connected to MSC 150. MSC 150 comprises also a VLR 152. MSC 150 is connected to GMSC 156. There is also HLR 154, which stores subscriber data pertaining to the location of subscribers and their service data. GMSC 156 is also connected to PSTN 126. CSE 158 controls GMSC 156 and MSC 150 in the providing of IN services to the subscribers served by BSS 160. CSE 158 has also an interface to HLR 154, which allows the enquiring and modifying of service data in HLR 154. A plurality of standardized supplementary services is implemented directly by MSC 150, GMSC 156, VLR 152 and HLR 154. Examples of such services include call forwarding, call waiting, call transfer, call completion to busy subscriber, closed user group and call barring. In addition to these there may be a variety of vendor specific supplementary services implemented directly in these network elements. In order to cater for the aforementioned legacy supplementary services a variety of service functionalities are present in MSC 150, GMSC 156, VLR 152 and HLR 154. These service functionalities are illustrated in FIG. 1 as service functionality sets 170-174. Each service functionality set may comprise a number of different service functionalities hosted in a given network element.

In order to support the same legacy services while MS 100 is in the service area of WLAN 124, the service functionality sets 170-174 must be ported to corresponding IMS network elements comprising at least P-CSCF 102, I-CSCF 104, S-CSCF 106 and HSS 108. This represents a significant task since all the development effort put in the service functionality sets 170-174 must be repeated when equivalent service functionality sets 180-184 are implemented in IMS network elements. For example, service functionality set 170 in MSC would correspond to service functionality set 182 in S-CSCF 106 and service functionality set 171 in CSE would correspond to service functionality sets 181, 183 and 184 in AS 110, CSE 116 and OSA server 118, respectively. However, the correspondence is not direct and obvious. It is sufficient to say that the work in the porting of legacy service functionality sets from the GSM/UMTS circuit switched core network to IMS side is non-trivial since the protocols used between the IMS network elements and the MS 100 are largely different from the ones used in GSM/UMTS circuit switched core network.

One possibility in the providing of legacy services for mobile stations roaming from GSM/UMTS BSS to WLAN side is presented in publication "SIP-Enabled Gateway MSC: Linking WiFi Hot Spots with 2.5/3G Networks", Amir Atai, Ajay Sahai, Telica, Mar. 31, 2004. The solution disclosed by Atai comprises the connecting of WLANs directly to a GMSC in the circuit switched core network, which acts also as a serving Visitor MSC (VMSC). The disadvantage of the solution disclosed by Atai is that a given subscriber is always served by a given GMSC. However, even in the case of dual system terminals, it must be possible for the operator to receive a terminating call for a given terminal in any GMSC. The treatment of terminating calls in the GMSC must be uniform across 2G/3G and WLAN terminals. The call must be routed to the correct serving VMSC using a roaming number obtained from an HLR irrespective of the type of the terminal. Further, it is beneficial to be able to configure the DNS so that a number of MSC servers are referred to using the same Fully Qualified Domain Name (FQDN), for example, "sip.operator.com", wherein "operator" stands for the operator name and "sip" stands for a set of SIP registrars. When a dual system terminal registers to the circuit switched core network via a WLAN and provides the FQDN for the SIP service, it is possible for the DNS to return IP-addresses for different MSC servers acting as SIP registrars in a round-robin fashion. Thus, at different registration times a different IP address may be provided from the DNS to the dual system terminal. Additionally, some legacy services may require that calls pertaining to legacy services must be routed to/via a voice server or a centralized IN service switching point. Thus, it would be a benefit to be able to use legacy ISUP signaling between the circuit switched core network elements. When pure SIP signaling is used the users' ITU-T E.164 format subscriber numbers are not available.

SUMMARY OF THE INVENTION

The invention relates to for routing calls in a communication system comprising at least a mobile station, a first call control node, a second call control node, a directory and a home location register. The method comprises: receiving a registration message from said mobile station to said first call control node, said registration message comprising a logical name referring to said mobile station; mapping said logical name to an International Mobile Subscriber Identity (IMSI) referring to said mobile station in said directory at the request of said first call control node; updating the location of said mobile station to said home location register at the request of said first call control node, said request comprising said International Mobile Subscriber Identity; receiving a call set-up request message in said second call control node, said call set-up request message comprising at least a called party number; sending an inquiry message from said second call control node to said home location register, said inquiry message comprising at least said called party number; allocating a roaming number from said first call control node at the request of said home location register; sending an inquiry response message from said home location register to said second call control node comprising at least said roaming number; sending a call set-up request message from said second call control node to said first call control node; and mapping said called party number to said logical name referring to said mobile station in said directory at the request of said first call control node.

The invention relates also to a system comprising at least a mobile station, a first call control node, a second call control node, a directory and a home location register. The system further comprises: a mobility entity in said first call control node configured to receive a registration message from said mobile station, said registration message comprising a logical name referring to said mobile station, to request the mapping of said logical name to an International Mobile Subscriber Identity (IMSI) referring to said mobile station from said directory, to request the updating of the location of said mobile station from said home location register by specifying said International Mobile Subscriber Identity (IMS); a call control entity in said second call control node configured to receive a call set-up request message, said call set-up request message comprising at least a called party number, to send an inquiry message from said second call control node to said home location register, said inquiry message comprising at least said called party number, to receive an inquiry response message from said home location register comprising at least a roaming number, to send a call setup request message to said first call control node; and a call control entity in said first call control node configured to request the mapping of said called party number to said logical name referring to said mobile station from said directory.

The invention relates also to a call control node comprising a mobility entity configured to receive a registration message from a mobile station, said registration message comprising a logical name referring to said mobile station, to request the mapping of said logical name to an International Mobile Subscriber Identity (IMSI) referring to said mobile station from a directory, to request the updating of the location of said mobile station from a home location register by specifying said International Mobile Subscriber Identity (IMSI) and a call control entity configured to receive a call set-up request message, said call set-up request message comprising at least a called party number, to send an inquiry message to said home location register, said inquiry message comprising at least said called party number, to receive an inquiry response message from said home location register comprising at least a roaming number, to send a call set-up request message to a second call control node, and to request the mapping of said called party number to said logical name referring to said mobile station from said directory.

The invention also relates to a computer program comprising code adapted to perform the following steps when executed on a data-processing system: receiving a registration message from a mobile station, said registration message comprising a logical name referring to said mobile station; requesting the mapping of said logical name to an International Mobile Subscriber Identity (IMSI) referring to said mobile station from a said directory; requesting the updating of the location of said mobile station from a home location register, said request comprising said International Mobile Subscriber Identity; receiving a call set-up request message, said call set-up request message comprising at least a called party number; sending an inquiry message to said home location register, said inquiry message comprising at least said called party number; receiving an inquiry response message from said home location register comprising at least a roaming number; sending a call set-up request message to another call control node; and requesting the mapping of said called party number to said logical name referring to said mobile station from said directory.

In one embodiment of the invention, a calling party number is obtained in the second call control. The calling party number is obtained, for example, for the call set-up request message received to the second call control node. The calling party number is provided to the first call control node in the call set-up message that is sent in response to receiving the roaming number from the home location register. When receiving the call set-up request message, the first call control node extracts the calling party number and determines whether the calling party number comprises a prefix, which indicates that the calling party number may be translated to a logical name. If the calling party number comprises such as prefix it is mapped to a second logical name referring to a calling party in the directory at the request of said first call control node. The directory returns the second logical name to the first call control node in response. The call set-up request messages and the calling party number analysis are performed in a call control entity in the call control node.

In one embodiment of the invention, the availability of a Wireless Local Area Network (WLAN) at the mobile station is determined in a communication entity of the mobile station. The communication entity establishes a connection from said mobile station to an access router connected to the wireless local area network. The communication entity obtains the identity of said first call control node via said access router. The access router is, for example, a router that controls packet data service access to and from mobile stations in the area of the WLAN. The router may also perform authentication, authorization and accounting functions for mobile stations in the WLAN to which it is connected.

In one embodiment of the invention, the communication system comprises a Wireless Local Area Network (WLAN).

In one embodiment of the invention, the mobile communication system comprises at least one of a Global System of Mobile Communications (GSM) network and a Universal Mobile Telephone System (UMTS) network.

In one embodiment of the invention, the first and the second call control nodes are Mobile Service Switching center Servers (MSS). The MSSes may control at least one media gateway or media proxy, which handle user plane traffic. The user plane traffic may be received from the Public Switched Telephone Network (PSTN) or other call control nodes as a circuit switched connection, which is converted in a media gateway to a packet switched connection. In one embodiment of the invention, the first and the second call control nodes are Mobile Service Switching Centers (MSC).

In one embodiment of the invention, the mobile station comprises a Session Initiation Protocol (SIP) user agent. When in the area of a WLAN, the user agent performs location registration by sending Session Initiation Protocol (SIP) registration messages to the first call control node. The call control nodes may comprise a call control entity, which communicates with the user agent using Session Initiation Protocol (SIP) signaling. The call control entity may communicate with other call control nodes using a circuit switched signaling such as ISDN User Part (ISUP). If a calling party and a called party belong to the same operator's network, the user plane traffic may not be converted to a circuit switched connection, but may be instead carried over packet data from the calling party mobile station to the called party mobile station. In that case, the user plane IP addresses associated with the calling and the called parties are carried in ISUP signaling messages.

In one embodiment of the invention, the call set-up request message is an ISDN User Part (ISUP) call set-up request message. In one embodiment of the invention, the call set-up request message is a Session Initiation Protocol (SIP) Invite message or generally any equivalent voice over IP call set-up request message.

In one embodiment of the invention, the directory is a Lightweight Directory Access Protocol (LDAP) directory. The directory is accessed using the LDAP protocol.

In one embodiment of the invention, the mobile station comprises a wireless local area network terminal. In one embodiment of the invention, the mobile station comprises a Subscriber Identity Module (SIM).

In one embodiment of the invention, the mobile station is a multi-radio terminal, which is supports both WLAN and licensed band radio connectivity. Licensed band radio connectivity comprises, for example, Global System of Mobile communications (GSM) radio connectivity and Universal Mobile Telecommunication System (UMTS) connectivity on the radio bands that have been allocated for operators providing 2G and 3G service.

In one embodiment of the invention, the call control entity within the call control node is a software component. In one embodiment of the invention, the mobility entity within the call control node is a software component. In one embodiment of the invention, the communication entity within the mobile station node is a software component. Each of these components may comprise at least one independently compiled or translated program module. The components may comprise a number of processes or threads executed in a processor or a virtual machine such as a Java virtual machine.

In one embodiment of the invention, the computer program is stored on a computer readable medium. The computer readable medium may be a removable memory card, magnetic disk, optical disk or magnetic tape.

In one embodiment of the invention, the term call refers also to a short message. In this embodiment the call setup message is a short message delivery message and the call control entity is a short message delivery entity. In this case the roaming number is a routing number for delivering the short message to the first call control entity.

In one embodiment of the invention, the DNS is configured so that a number of MSC servers are referred to using the same Fully Qualified Domain Name (FQDN), for example, "sip.operator.com", wherein "operator" stands for the operator name and "sip" stands for a set of SIP registrars. When a dual system terminal registers to the circuit switched core network via a WLAN and provides the FQDN for the SIP service, the DNS may return IP-addresses for different MSC servers acting as SIP registrars in a round-robin fashion. Thus, at different registration times a different IP address may be provided from the DNS to the dual system terminal.

The benefits of the invention are related to the uniform handling of 2G/3G terminals and dual system terminals from the core network and supplementary service perspective. In the case of any dual system terminal supporting both WLAN and licensed band access, it is possible for the operator to receive a terminating call for the terminal in any GMSC. The subscriber numbering is not affected due to the fact that the terminal is a dual system terminal. The call may be routed to the correct serving VMSC using a roaming number obtained from an HLR irrespective of whether the current VMSC acts as a SIP registrar for a WLAN hot spot or whether the current VMSC is simply serving a 2G/3G area.

Further, it is possible to configure the DNS so that a number of MSC servers are referred to using the same Fully Qualified Domain Name (FQDN). When a dual system terminal registers to the circuit switched core network via a WLAN and provides the FQDN for the SIP service, the DNS may return IP-addresses for different MSC servers acting as SIP registrars in a round-robin fashion. Thus, at different registration times a different IP address may be provided from the DNS to the dual system terminal.

Further, by allowing the use of MSISDN numbers in a call set-up request messages received to a gateway MSS, it is possible to maintain the normal circuit switched core network roaming mechanisms comprising the use of HLRs, VLRs and roaming number allocation. It is not necessary to employ the different mechanisms for IP multimedia subsystem. This allows the use of legacy supplementary services from the circuit switched core network. From supplementary service point of view the treating of WLANs in a manner similar to licensed band radio service areas provides for easier service deployment and operation.

Additionally, some legacy services may require that calls pertaining to legacy services must be routed to/via a voice server or a centralized IN service switching point. Thus, it is a benefit to be able to use legacy ISUP signaling between the circuit switched core network elements.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE EMBODIMENTS

Reference will now be made in detail to the embodiments of the present invention, examples of which are illustrated in the accompanying drawings.

Figure 1:
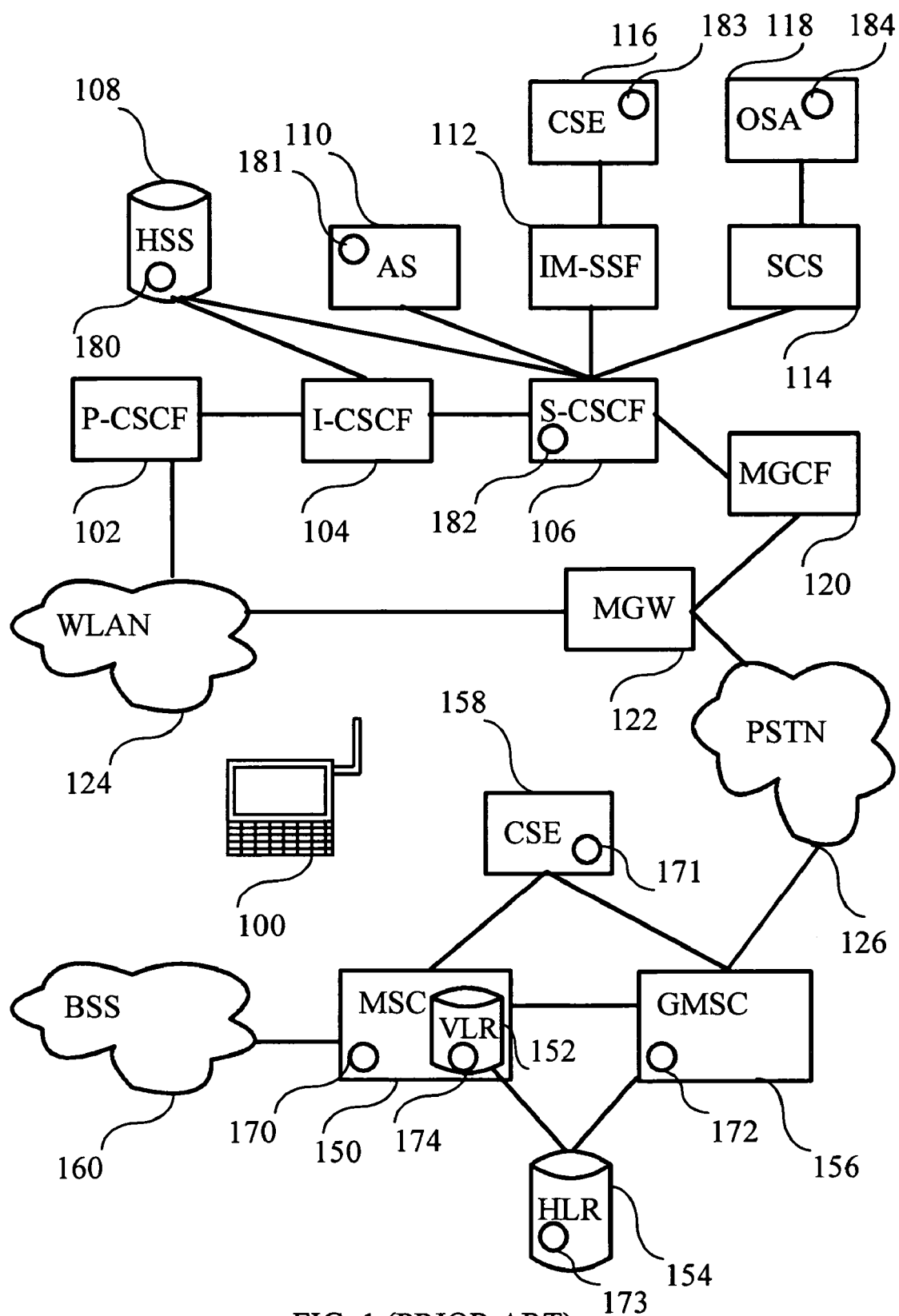
FIG. 1 is a block diagram illustrating the problems associated with the providing of legacy services for dual system terminals in prior art.
Figure 2:
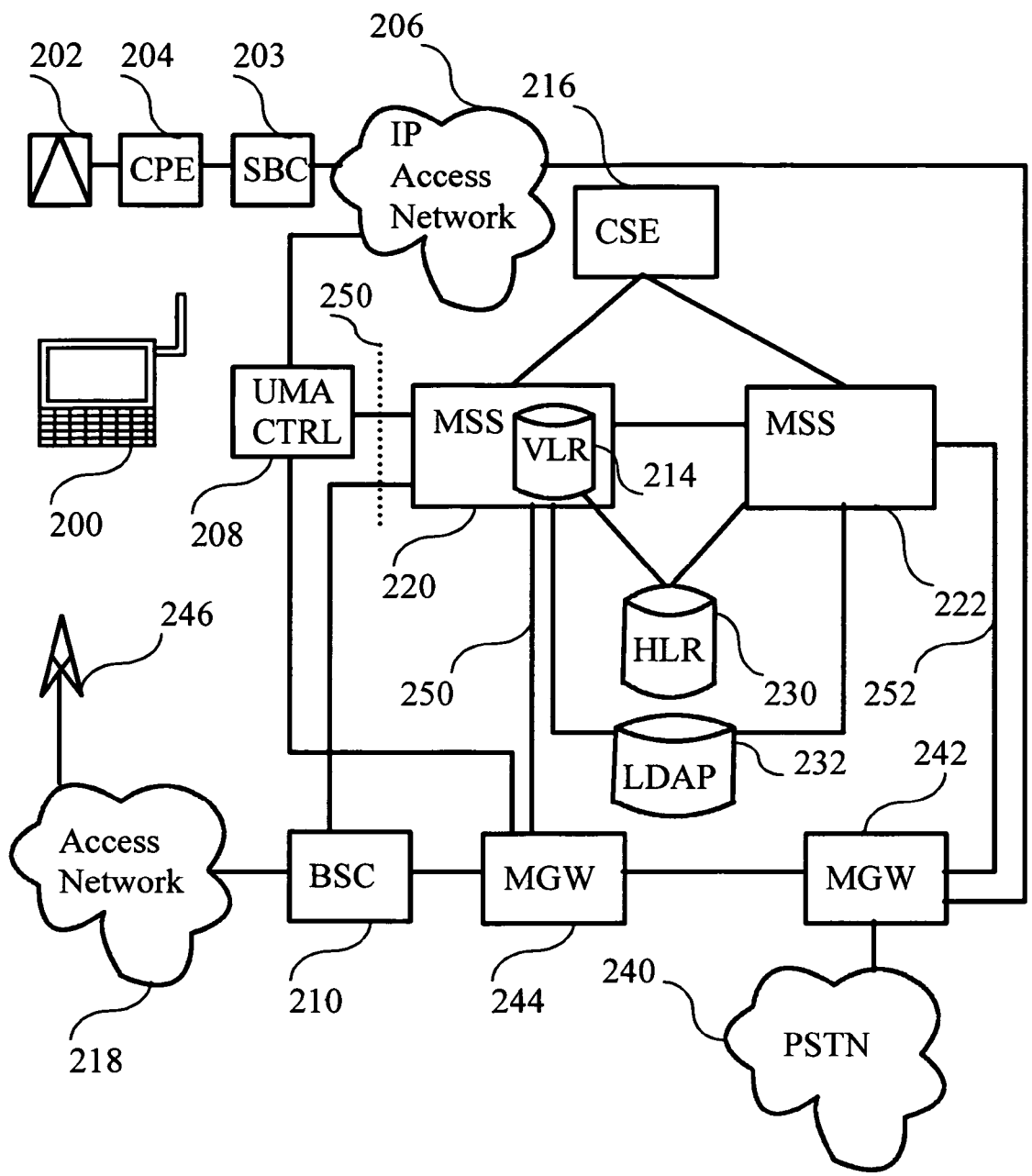
FIG. 2 is a block diagram illustrating a communication system according to the invention.

FIG. 2 is a block diagram illustrating a communication system according to the invention. The communication system comprises at least a Mobile Station (MS) 200, a serving MSS 220, a gateway MSS 222, a Home Location Register (HLR) 230, a Lightweight Directory Access Protocol (LDAP) directory 232, a Camel Service Entity (CSE) 216, a Base Station Controller (BSC) 210 and a first access network 218 connected to a Base Transceiver Station (BTS) 234. MS 200 is a SIP enabled user agent, which obtains SIP connectivity via MSS 220. MS 200 is a multi-radio terminal, which is supports both WLAN and licensed band radio connectivity. In one embodiment of the invention, MS 200 comprises a communication entity (not shown), which performs all communication related functions. A WLAN Base Transceiver Station (BTS) 202 provides WLAN radio connectivity, whereas a BTS 246 supports licensed band radio connectivity. Licensed band radio connectivity may be, for example, based on WCDMA radio access or TDMA radio access. Serving MSS 220 comprises a Visitor Location Register (VLR) 214, which stores subscriber data for subscribers currently registered in serving MSS 220. Gateway MSS 222 has a signaling connection to a Public Switched Telephone Network (PSTN) 240 and to serving MSS 220. Gateway MSS 222 controls a first MGW 242 and MSS 220 controls a second MGW 244. First MGW 242 is connected to PSTN 240 and provides user plane conversion to/from circuit switched E1/T1 to IP packets. Second MGW 244 is connected to PSTN 240 and provides user plane conversion to/from circuit switched BSC 210 to IP packets. UMA controller 208 may also provide a circuit switched connection to second MGW 244. Packets are routed between first MGW 242 and second MGW 244 based on requests from MSS 222 and MSS 220, respectively. BSC 210 is connected to MSS 220 using protocol interface 250. Protocol interface 250 is, for example, GSM A/Gb-interface or UMTS Iu-interface. BSC 210 may thus also be a UMTS Radio Network controller.

In FIG. 2 there is also a second access network 206, the signaling plane of which is connected to MSS 220 via an Unlicensed Mobile Access (UMA) controller 208. Second access network 206 is an IP based Access Network. UMA controller 208 interfaces into MSS 220 by looking like a standard RAN. In other words, UMA controller 208 emulates BSC 210 for MSS 220. To second access network 206 is also connected via a Session Border Controller (SBC) 203 a Customer Premise Equipment (CPE), which is, for example, an access router. WLAN Base Transceiver Station (BTS) 202 is connected to CPE 204. There may be a number of WLAN BTSes, which are connected via CPE 204 to second access network 206. SBC 203 acts as a SIP proxy and hides the address space within the operator's network, which comprises at least the second access network 206 from MS 200. User plane traffic to/from MS 200 goes via SBC 203 to first MGW 242 when there is a call between MS 200 and a subscriber connected to PSTN 240. SBC 203 may also perform standard firewall related tasks such as packet filtering. LDAP directory 232 is used to perform translation of SIP URIs to ITU-T E.164 addresses and vice versa. For example, LDAP directory translates calling party SIP URIs to calling party IMSIs on the requests of serving MSSes and provides the IMSIs in respective response messages. As MS 200 performs registration, in other words, an initial location updating procedure, in MSS 220 the LDAP directory provides the subscriber information to MSS 220, which is not normally available via SIP signaling from MS 200 to MSS 220, but which is available via GSM A-interface signaling or UMTS Iu-interface signaling either at location updating or at call set-up request. Such information includes, for example, an IMSI corresponding to MS 200 SIP URI. The information is provided from LDAP directory 232 to MSS 220 at the request of MSS 220.

In one embodiment of the invention, the operator's network uses a single LDAP directory, for example, LDAP directory 232. As a subscriber registers via any MSS equipped with a SIP-interface, the same LDAP directory may be accessed. Thus, the LDAP directory is the same irrespective of the enquiring MSS. In one embodiment of the invention, there is more than one LDAP directory.

Figure 3:
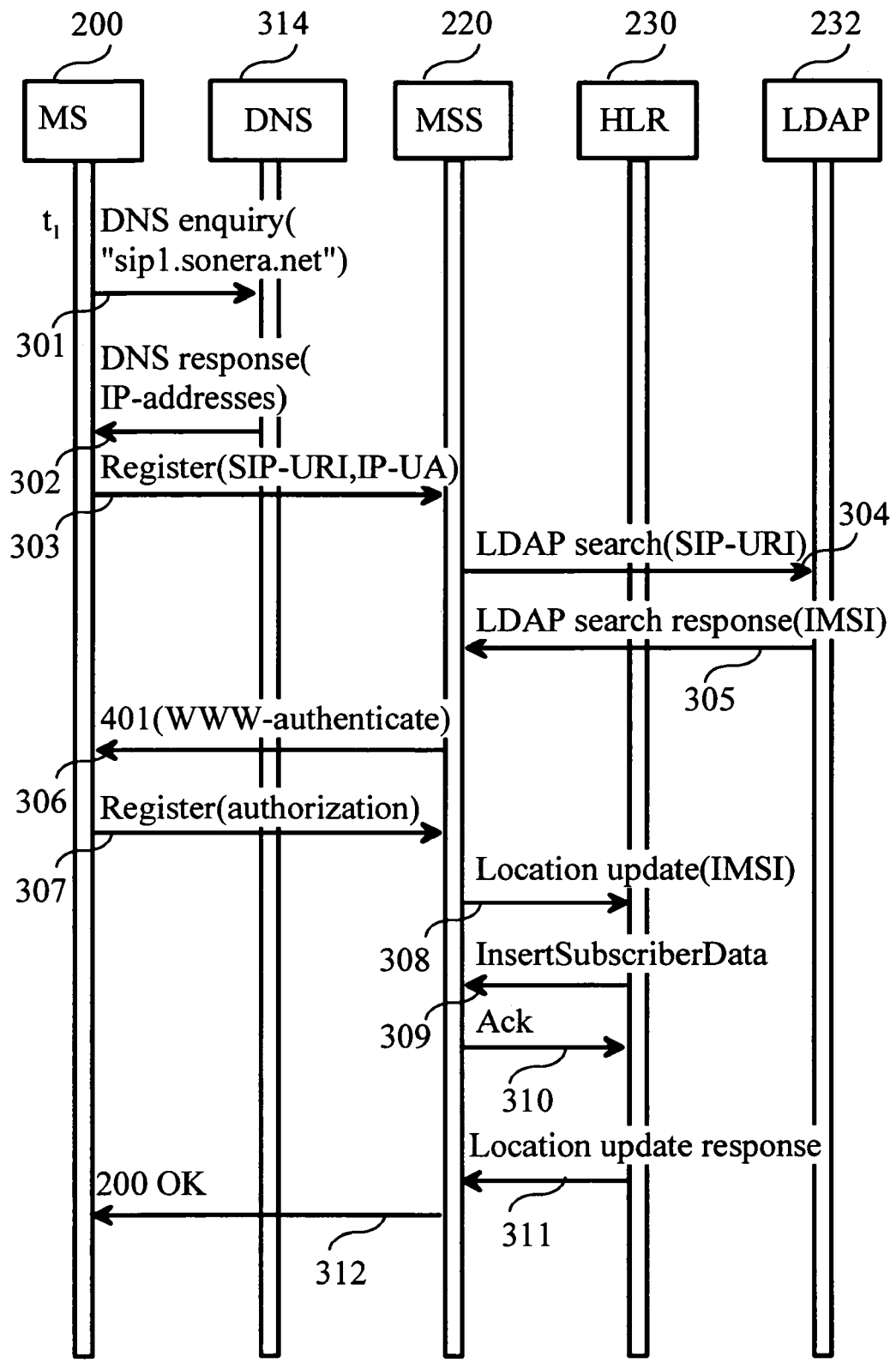
FIG. 3 is a message sequence chart illustrating location updating from a Session Initiation Protocol (SIP) User Agent (UA) to a Mobile Switching Center Server (MSS) in one embodiment of the invention.

FIG. 3 is a message sequence chart illustrating location updating from a Session Initiation Protocol (SIP) User Agent (UA) to a Mobile Switching Center Server (MSS) in one embodiment of the invention. At time $t_1$ MS 200 determines that WLAN access via WLAN BTS 202 is available and determines that communication to and from MS 200 should be routed via WLAN radio access. MS 200, in other words, a SIP user agent sends a DNS enquiry message to a DNS server 314 as illustrated with arrow 301. The DNS enquiry message specifies a SIP server Fully Qualified Domain Name (FQDN), which is resolved by DNS server 314 into at least one IP address. In FIG. 3 there is provided a single IP address that refers to MSS 220. DNS server 314 responds with an enquiry response message, which provides the IP address to MS 200 as illustrated with arrow 302. Thereupon, MS 200 sends a SIP Register message to MSS 220 as illustrated with arrow 303. The SIP Register message carries at least the SIP URI of MS 200 and the user agent IP address to be used by MSS 220 to send user plane and signaling plane packets to MS 200. The SIP Register message may traverse an SBC (not shown), which alters the user agent IP address. As MSS 220 receives the SIP Register message, it sends an LDAP search message to LDAP directory 232 as illustrated with arrow 304. The LDAP search message comprises at least the SIP URI referring to MS 200. In response to LDAP search message LDAP directory 232 obtains the subscriber data associated with the SIP URI. LDAP directory 232 sends an LDAP search response message to MSS 220 as illustrated with arrow 305. The LDAP search response message comprises at least the IMSI associated with MS 200. Other parameters comprised in the LDAP search response message may comprise a calling party E.164 address associated with MS 200 (MSISDN-A), a user name and authentication related parameters such as a nonce and an expected authentication response from MS 200. When receiving the LDAP search response message MSS 220 sends a SIP 401 response message to MS 200 as illustrated with arrow 306. The SIP 401 response message comprises a WWW-authenticate/digest header, which in turn comprises the realm associated with SIP service in the operator's network, the operator's domain, the nonce received from LDAP directory 232 and an algorithm to be used in authentication, which is normally Message Digest 5 (MD5). In response to receiving the SIP 401 response message, MS 200 provides a SIP Registration message to MSS 220 as illustrated with arrow 307. The SIP Registration message comprises an authorization/digest header, which comprises the user name associated with MS 200, the realm associated with SIP service in the operator's network, the operator's domain, the nonce, an URI associated with MSS 220 and a response generated by MS 200 based on parameters received in SIP 401 response message. Upon receiving the SIP Registration message comprising the authorization/digest header, MSS 220 compares the response generated by MS 200 to the expected response received from LDAP directory 232.

In response to successful authentication MSS 220 starts performing location update with HLR 230. MSS 220 updates the location of MS 200 to the VLR 214 associated with it. However, in the case of FIG. 3 the VLR 214 is considered as part of MSS 220 and is not shown separately. In one embodiment of the invention, MSS 220 obtains all the MS 200 parameters necessary for location updating that are not provided in SIP Register message from LDAP directory 232. After the successful authentication, MS 200 sends a location update request message to HLR 230 as illustrated with arrow 308. The location update request message comprises at least the IMSI associated with MS 200. In response to the receiving of the location update request message HLR 230 sends at least one insert subscriber data message to MSS 220 as illustrated with arrow 309. The insert subscriber data message provides subscriber data associated with MS 200. The subscriber data is updated to the VLR 214 associated with MSS 220. MSS 220 acknowledges insert subscriber data message as illustrated with arrow 310. When all insert subscriber data messages have been acknowledged by MSS 220, HLR 230 sends a location update response message to MSS 220 as illustrated with arrow 311. Thereupon, MSS 220 sends a SIP 200OK message to MS 200 as illustrated with arrow 312.

Figure 4:
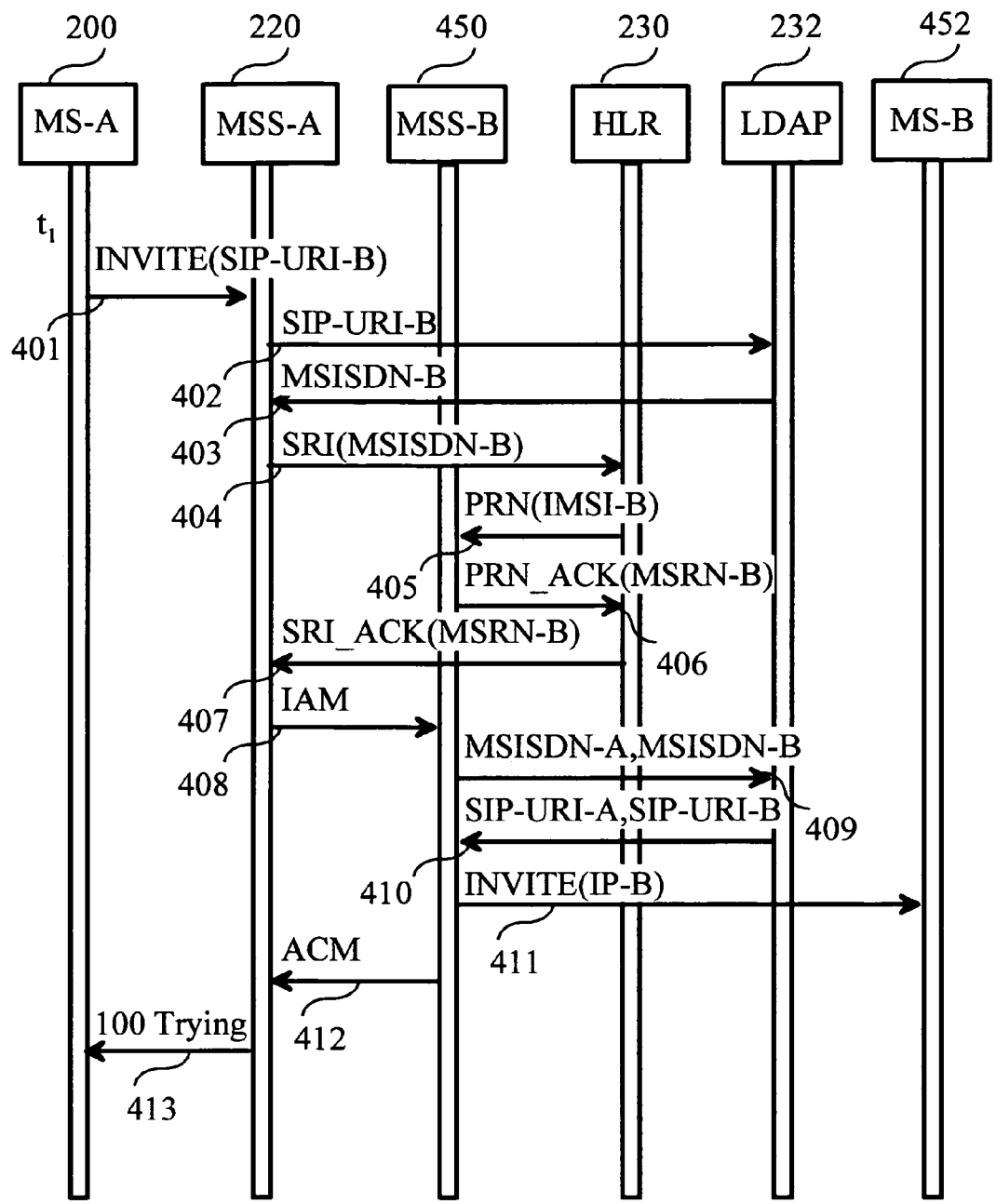
FIG. 4 is a message sequence chart illustrating a mobile-to-mobile call between two User Agents (UA) that are Session Initiation Protocol (SIP) based in one embodiment of the invention.

FIG. 4 is a message sequence chart illustrating a mobile-to-mobile call between two User Agents (UA) that are Session Initiation Protocol (SIP) based in one embodiment of the invention. The user agents are the calling party mobile station, namely MS 200 and the called party mobile station, namely MS 452. The calling party is referred to as the A-party and the called party as the B-party, hence the designation of letters A and B to respective network elements and addresses associated with the respective parties. MS 200 is handled by MSS 220, which is thus also referred to as the MSS of the calling party (MSS-A). MS 452 is handled by MSS 450, which is thus also referred to as the MSS of the called party (MSS-B). Initially, at time $t_1$ the user of MS 200 decides to place an outgoing call to MS 452. The calling user specifies the called party by selecting or entering SIP-URI-B, which is a SIP URI according to RFC 3261. MS 200 sends a SIP Invite message to MSS 220 in which MS 200 is currently registered as illustrated with arrow 401. Upon receiving the SIP Invite message MSS 220 sends an LDAP search request message to LDAP directory 232 as illustrated with arrow 402. The LDAP search request message comprises at least the called party SIP-URI-B. When the SIP-URI-B is obtained by LDAP directory 232, it is translated to an E.164 address, namely MSISDN-B. LDAP directory 232 sends an LDAP search response message to MSS 220, which comprises at least the MSISDN-B, as illustrated with arrow 403.

Upon receiving the LDAP search response message and the MSISDN-B MSS 220 is now capable of routing a call to MS 452 using the routing means of MSC servers without employing IMS routing means. The routing means of MSC servers are similar to the routing means of circuit switched calls in GSM/UMTS core networks. Similarly, it is possible for MSS 220 to use the service functionalities catering for the supplementary services of circuit switched calls. Further, it is possible for MSS 220 to use billing functionalities catering for circuit switched calls. It should also be noted that since the calling party E.164 number MSISDN-A is available from the LDAP directory enquiry performed during location updating, it is possible to use also MSISDN-A in the providing of supplementary services. For example, both MSISDN-A and MSISDN-B may be used instead of SIP names to refer to the calling and the called party if an enquiry is sent to CSE 216 in order to initiate Camel supplementary services. The Camel supplementary service only needs to inspect E.164 addresses instead of SIP URIs.

MSS 220 sends a Send Routing Instructions (SRI) message to HLR 230 comprising MSISDN-B, as illustrated with arrow 404. Upon receiving the Send Routing Instructions message HLR 230 obtains the subscriber data associated with the called subscriber. HLR 230 knows the MSC server and VLR, in which the called subscriber is registered, namely MSS 450. The HLR in turn enquires MSS 450 and the VLR therein by sending a Provide Roaming Number (PRN) message as illustrated with arrow 405. The roaming number is also known as Mobile Station Roaming Number (MSRN). The VLR then provides the HLR 230 with a roaming number using message illustrated with arrow 406. The roaming number is then used to route the call towards MSS 450. The HLR packs the data associated with the called subscriber and the roaming number in its response message 407 to MSS 220, which will act as a Gateway MSC in accordance with the GSM/UMTS circuit switched core network. The MSS 220 then routes the call in a direction towards MSS 450 using the roaming number. The MSS 220 sends an ISUP Initial Address Message (IAM) forward towards MSS 450 and starts waiting for the ACM message from the direction of MSS 450, as illustrated with arrow 408. The ISUP IAM message comprises, for example, the calling party E.164 address, namely MSISDN-A, and the called party E.164 address, namely MSISDN-B. Upon receiving IAM message 408 from MSS 220, MSS 450 sends an LDAP search request message to LDAP directory 232 as illustrated with arrow 409. The LDAP search request message comprises, for example, the MSISDN-A and MSISDN-B parameters from ISUP IAM message. In response to the LDAP search request message, LDAP directory 232 maps the MSISDN-A and MSISDN-B to SIP-URI-A and SIP-URI-B. LDAP directory 232 sends an LDAP search request response message comprising SIP-URI-A and SIP-URI-B as illustrated with arrow 410. After having received the SIP URIs from the LDAP search response message, MSS 450 sends a SIP Invite message to MS 452 as illustrated with arrow 411. The SIP Invite message comprises at least the SIP-URI-A and SIP-URI-B parameters and the IP address used to send user plane and signaling plane packets to MS 452. The IP address has been provided to MSS 450 during location update signaling. The IP address is either directly associated with MS 452 or it refers to an SBC via which SIP signaling messages are sent to MS 452. MSS 450 sends an ISUP Address Complete Message (ACM) to MSS 220 as illustrated with arrow 412. Thereupon, MSS 220 sends a SIP trying message to MS 200 as illustrated with arrow 413.

In one embodiment of the invention, SIP signaling is used between MSS 220 and MSS 450. In this case, for example, the call set-up message is a SIP Invite message. Even though SIP signaling is used between MSS 220 and MSS 450, it is still possible to use MSISDN and roaming number for the routing of calls to MS 200. This allows the maintaining of legacy supplementary services and billing mechanisms that employ E.164 numbers instead of SIP names.

In one embodiment of the invention, the user plane and the signaling plane packets associated with a given MS have different IP addresses. In one embodiment of the invention, the IP addresses refer to Packet Data Protocol Contexts (PDP) within a General Packet Radio System (GPRS) Gateway GPRS Support Node (GGSN).

Figure 5:
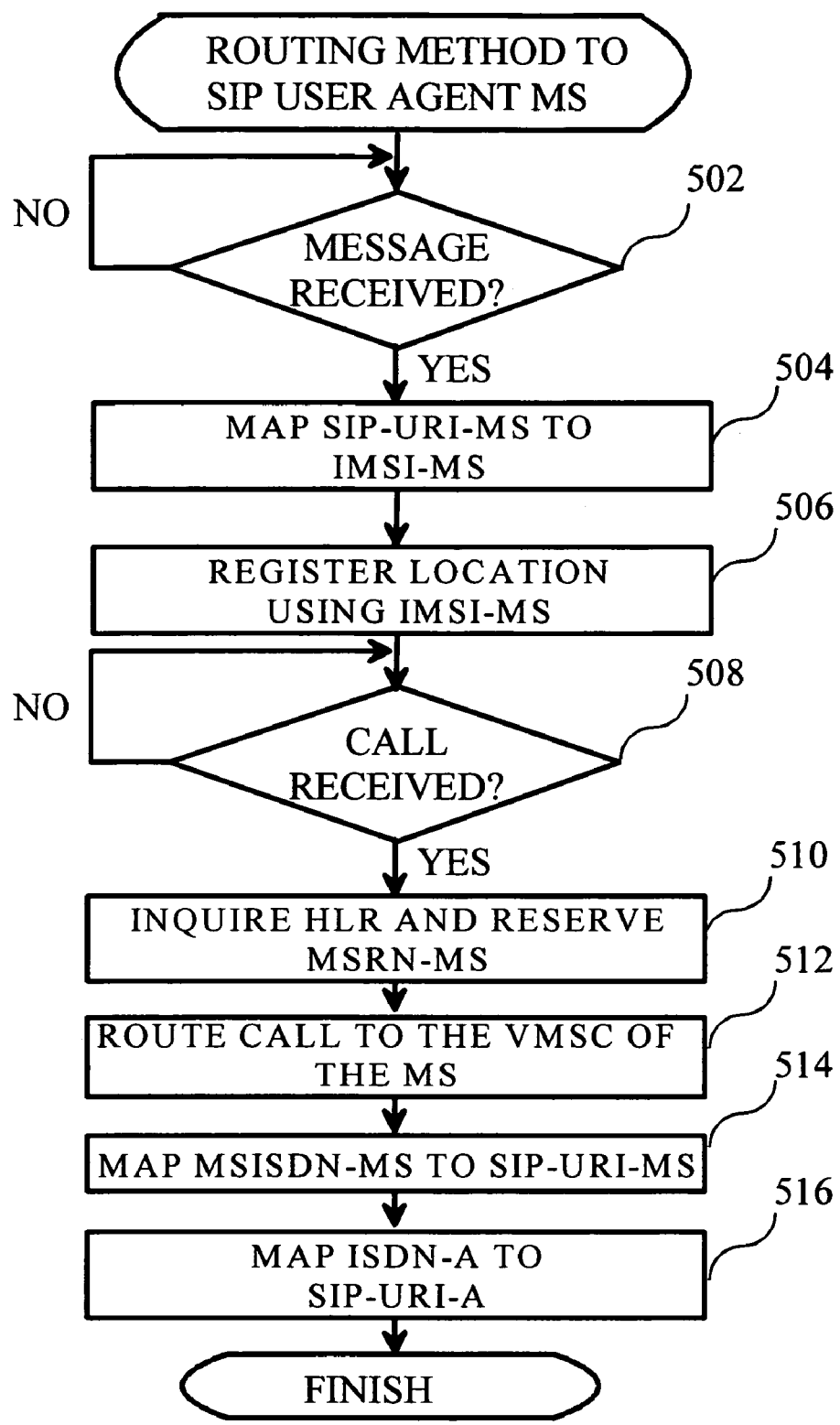
FIG. 5 is a flow chart depicting one embodiment of a method for the routing of communications to a Session Initiation Protocol (SIP) User Agent in a communication system.

FIG. 5 is a flow chart depicting one embodiment of a method for the routing of communications to a Session Initiation Protocol (SIP) User Agent in a communication system.

At step 502 a first MSS waits for a location update message from an MS. If no message is received, the method continues at step 502.

At step 504 the first MSS maps the SIP URI received in the location update message from the MS to an IMSI associated with the MS.

At step 506 the first MSS sends a location updating request to an HLR. In the location update request message the IMSI associated with the MS is specified.

At step 508 a second MSS receives a call set-up request addressed to the MS. The call request provides at least an MSISDN associated with the MS.

In one embodiment of the invention the call set-up request provides only a SIP URI associated with the MS. The second MSS maps the SIP URI to the MSISDN associated with the MS.

At step 510 the second MSS enquires the HLR using the MSISDN associated with the MS and reserves a roaming number from the first MSS in order to route the call to the MS. The roaming number may be reserved from a visitor location register in association with the first MSS.

At step 512 the second MSS routes the call set-up request to the first MSS using the roaming number.

At step 514 the first MSS receives the call set-up request. In one embodiment of the invention, the first MSS maps the MSISDN associated with the MS to the SIP URI associated with the MS.

At step 516 the first MSS checks if the calling party number in the call set-up request may be mapped to a SIP URI associated with the calling party. The check may be performed, for example, by analyzing the calling party number and determining whether the number comprises a prefix, which indicates that the calling party number may be mapped to a SIP URI.

Figure 6:
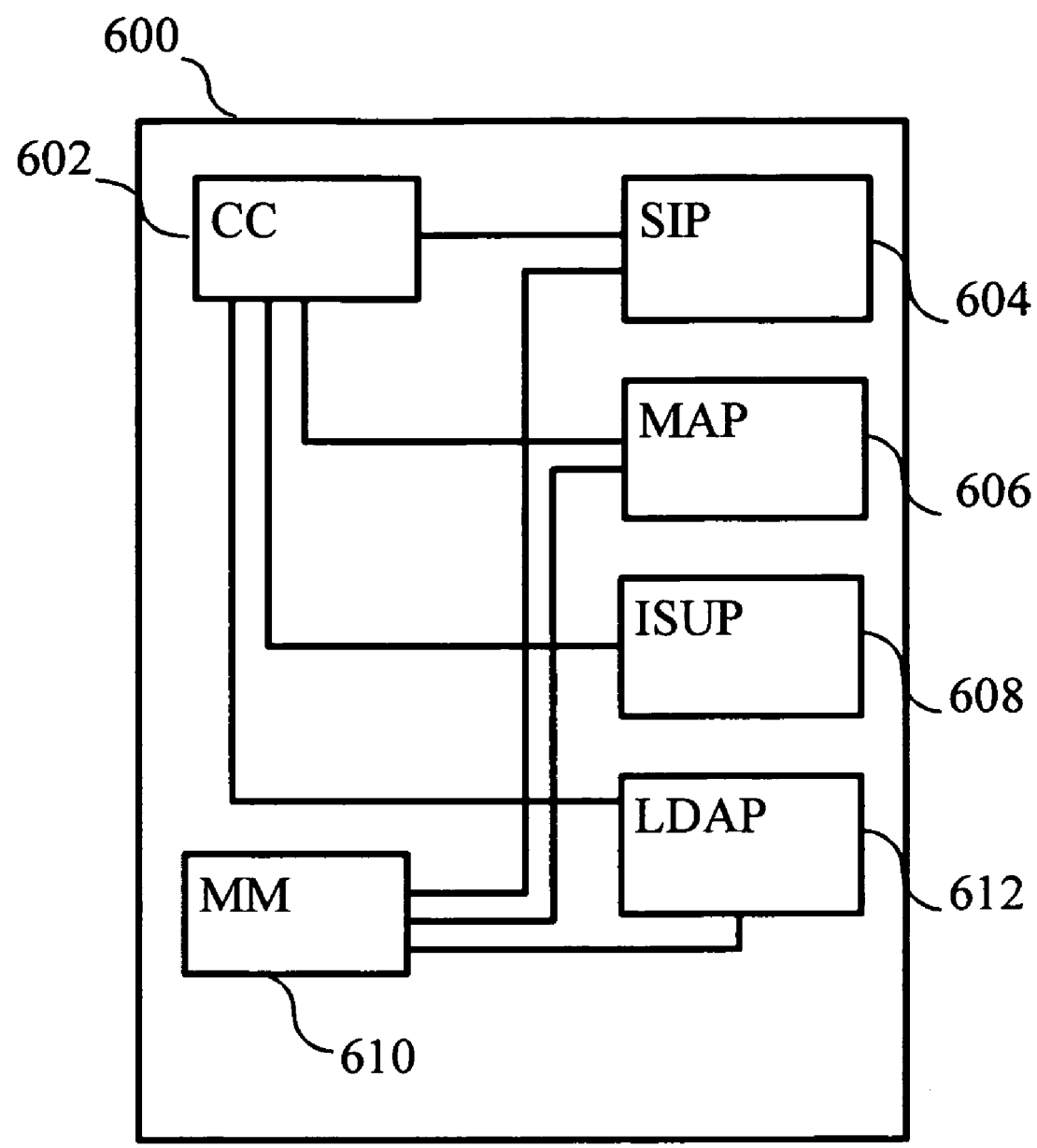
FIG. 6 is a block diagram illustrating a Mobile Switching Center Server (MSS) in one embodiment of the invention.

FIG. 6 is a block diagram illustrating a Mobile Switching Center Server (MSS) in one embodiment of the invention. In FIG. 6 there is a Mobile Switching Center Server (MSS) 600. MSS 600 comprises a Call Control (CC) entity 602 and a mobility management entity 610. The call control entity communicates with a Session Initiation Protocol (SIP) entity 604, which in turn communicates, for example, with a mobile station such as mobile station 200 in FIG. 2. The call control entity 602 communicates also with a Mobile Application Part (MAP) entity, which is used to access the home location register. Call control entity 602 may also communicate with an ISUP entity in order to establish, maintain and release calls. Mobility management entity 610 communicates with the home location register via mobile application part entity 606. Mobility management entity 610 is used in the updating of mobile station location in the home location register. Registration requests are received to the mobility management entity 610 from mobile stations via the session initiation protocol entity 604. Mobility management entity 610 and call control entity 602 communicate with a directory using a Lightweight Directory Access Protocol (LDAP) entity 612. In one embodiment of the invention, the mobility management entity 610 comprises also a visitor location register.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A method, comprising:
   receiving, at a first call control node, a registration message from a mobile station, said registration message comprising a logical name referring to said mobile station;
   sending a request to map said logical name to an International Mobile Subscriber Identity referring to said mobile station in a directory;
   sending a request to update a location of said mobile station to a home location register said request of said first call control node comprising said International Mobile Subscriber Identity;
   receiving a request to allocate a roaming number from said home location register based on an inquiry message from a second call control node, said inquiry message comprising at least a called party number;

forwarding an inquiry response message to said home location register for further transmission to said second call control node comprising at least said roaming number;

receiving a call set-up request message comprising at least the called party number from said second call control node in said first call control node; and mapping said called party number to said logical name referring to said mobile station in said directory at a second request of said first call control node, thereby routing calls in a communication system comprising at least one mobile station, the first call control node, the second call control node, the directory and the home location register.

2. The method according to claim 1, the method further comprising:

determining in said first call control node whether said calling party number obtained from said second call control node comprises a prefix indicating that said calling party number may be translated to a second logical name; and mapping said calling party number to the second logical name referring to a calling party in said directory at a third request of said first call control node.

3. The method according to claim 1, the method further comprising:

determining an availability of a Wireless Local Area Network at said mobile station;

establishing a connection from said mobile station to an access router connected to said wireless local area network; and obtaining an identity of said first call control node via said access router.

4. The method according to claim 1, wherein said communication system comprises a Wireless Local Area Network.

5. The method according to claim 1, wherein said mobile communication system comprises at least one of a Global System of Mobile Communications network and a Universal Mobile Telephone System network.

6. The method according to claim 5, wherein said first and said second call control nodes are Mobile Service Switching center Servers.

7. The method according to claim 1, wherein said mobile station comprises a Session Initiation Protocol user agent.

8. The method according to claim 7, wherein said registration message is a Session Initiation Protocol registration message.

9. The method according to claim 1, wherein said call set-up request message is an Integrated Services Digital Network User Part call set-up request message.

10. The method according to claim 1, wherein said directory is a Lightweight Directory Access Protocol directory.

11. A system, comprising:

a mobility entity in a first call control node configured to receive a registration message from a mobile station, said registration message comprising a logical name referring to said mobile station, to request a mapping of said logical name to an International Mobile Subscriber Identity referring to said mobile station from a directory, and to request updating of a location of said mobile station from a home location register by specifying said International Mobile Subscriber Identity;

a call control entity in a second call control node configured to receive a call set-up request message, said call set-up request message comprising at least a called party number, to send an inquiry message from said second call control node to said home location register, said inquiry message comprising at least said called party number, to receive an inquiry response message from said home location register comprising at least a roaming number, and to send a call set-up request message to said first call control node; and a call control entity in said first call control node configured to request a mapping of said called party number to said logical name referring to said mobile station from said directory, wherein the system comprises at least one mobile station, the first call control node, the second call control node, the directory and the home location register.

12. The system according to claim 11, wherein the call control entity in said first call control node is configured to determine whether a calling party number comprises a prefix indicating that said calling party number may be translated to a second logical name, and to request the mapping of said calling party number to the second logical name referring to a calling party from said directory.

13. The system according to claim 11, the system further comprising:

a communication entity in said mobile station configured to determine the availability of a Wireless Local Area Network, to establish a connection from said mobile station to an access router connected to said wireless local area network, and to obtain an identity of said first call control node via access router.

14. The system according to claim 11, wherein said system comprises a Wireless Local Area Network.

15. The system according to claim 11, wherein said system comprises at least one of a Global System of Mobile Communications network and a Universal Mobile Telephone System network.

16. The system according to claim 15, wherein said first call control node and said second call control node are Mobile Service Switching center Servers.

17. The system according to claim 11, wherein said mobile station comprises a Session Initiation Protocol user agent.

18. The system according to claim 17, wherein said registration message is a Session Initiation Protocol registration message.

19. The system according to claim 11, wherein said call set-up request message is an ISDN User Part call set-up request message.

20. The system according to claim 11, wherein said directory is a Lightweight Directory Access Protocol directory.

21. A call control node comprising:

a mobility entity configured to receive a registration message from a mobile station, said registration message comprising a logical name referring to said mobile station, to request a mapping of said logical name to an International Mobile Subscriber Identity referring to said mobile station from a directory, and to request updating of a location of said mobile station from a home location register by specifying said International Mobile Subscriber Identity; and a call control entity configured to receive a call set-up request message, said call set-up request message comprising at least a called party number, to send an inquiry message to said home location register, said inquiry message comprising at least said called party number, to receive an inquiry response message from said home location register comprising at least a roaming number, to send a call set-up request message to a second call control node, and to request a mapping of said called party number to said logical name referring to said mobile station from said directory.

22. A computer program embodied within a computer readable medium, the computer program being configured to perform:
   receiving, at a first call control node, a registration message from a mobile station, said registration message comprising a logical name referring to said mobile station;
   requesting a mapping of said logical name to an International Mobile Subscriber Identity referring to said mobile station from a directory;
   requesting an update of a location of said mobile station from a home location register, said request comprising said International Mobile Subscriber Identity;
   receiving an inquiry response message from said home location register comprising at least a roaming number, said inquiry response message being based on an inquiry message from a second call control node, said inquiry message comprising at least a called party number;
   forwarding an inquiry response message to the home location register for further transmission to the second call control node, the inquiry response message comprising at least the roaming number;
   receiving the call set-up request message from another call control node; and
   requesting a mapping of said called party number to said logical name referring to said mobile station from said directory.

23. The computer program according to claim 22, wherein said computer readable medium is a removable memory card.

24. The computer program according to claim 22, wherein said computer readable medium is a magnetic or an optical disk.

25. An apparatus, comprising:
   receiving means for receiving, at a first call control node a registration message from a mobile station, said registration message comprising a logical name referring to said mobile station;
   sending means for sending a request to map said logical name to an International Mobile Subscriber Identity referring to said mobile station in a directory;
   sending means for sending a request to update a location of said mobile station to a home location register, said update request of said first call control node comprising said International Mobile Subscriber Identity;
   receiving means for receiving a request to allocate a roaming number from said home location register, said allocating request being based on an inquiry message from a second call control node, said inquiry message comprising at least a called party number;
   forwarding means for forwarding an inquiry response message to said home location register for further transmission to said second call control node, said inquiry response message comprising at least said roaming number;
   receiving means for receiving a call set-up request message comprising at least the called party number from said second call control node to said first call control node; and
   mapping means for mapping said called party number to said logical name referring to said mobile station in said directory at a second request of said first call control node.

26. A call control node, comprising:
   a mobility entity configured to receive a registration message from a mobile station, said registration message comprising a logical name referring to said mobile station, to request a mapping of said logical name to an International Mobile Subscriber Identity referring to said mobile station in a directory, and to request updating of a location of said mobile station to a home location register by specifying said International Mobile Subscriber Identity; and
   a call control entity configured to receive a request to allocate a roaming number from said home location register based on an inquiry message from a second call control node, said inquiry message comprising at least a called party number, to forward an inquiry response message to said home location register for further transmission to said second call control node comprising at least said roaming number, to receive a call set-up request message comprising at least the called party number from said second call control node and to map said called party number to said logical name referring to said mobile station in said directory at a second request of said call control node.

* * * * *